US012798936B2

(12) United States Patent
Delanghe et al.

(10) Patent No.: US 12,798,936 B2
(45) Date of Patent: Nov. 17, 2026

(54) NESTABLE WHEEL RAMPS WITH REMOVABLE CHOCKS

(71) Applicant: CALIBER INC., Burnsville, MN (US)

(72) Inventors: Ernest Delanghe, Burnsville, MN (US); Steven W. Potter, Burnsville, MN (US); William D. Butterfield, Burnsville, MN (US); Kasey L. Pipo, Elko, MN (US); Jon Leikvold, Burnsville, MN (US); Nathaniel Christian, Burnsville, MN (US)

(73) Assignee: CALIBER INC., Burnsville, MN (US)

( * ) Notice: Subject to any disclaimer, the term of this patent is extended or adjusted under 35 U.S.C. 154(b) by 363 days.

(21) Appl. No.: 18/523,046

(22) Filed: Nov. 29, 2023

(65) Prior Publication Data

US 2024/0174498 A1 May 30, 2024

Related U.S. Application Data

(60) Provisional application No. 63/428,251, filed on Nov. 28, 2022.

(51) Int. Cl.
*B66F 7/24* (2006.01)
*B60T 3/00* (2006.01)

(52) U.S. Cl.
CPC ................ *B66F 7/243* (2013.01); *B60T 3/00* (2013.01)

(58) Field of Classification Search
CPC .................................. B66F 7/243; B60T 3/00
See application file for complete search history.

(56) References Cited

U.S. PATENT DOCUMENTS

| | | | | |
|---|---|---|---|---|
| 8,782,839 | B1 * | 7/2014 | Forbis | B66F 7/243 254/88 |
| D923,280 | S * | 6/2021 | Zhang | D34/32 |
| 2008/0201873 | A1 * | 8/2008 | Haimoff | B66F 7/243 14/69.5 |
| 2009/0100613 | A1 * | 4/2009 | Igwemezie | B66F 7/243 14/69.5 |

FOREIGN PATENT DOCUMENTS

WO WO-2022198266 A1 * 9/2022 ............. B66F 7/243

* cited by examiner

*Primary Examiner* — Tyrone V Hall, Jr.
(74) *Attorney, Agent, or Firm* — Whitestone Law, PLLC

(57) ABSTRACT

A monolithic, polymer ramp for elevating a tire of a vehicle from ground level to an elevated position includes a slanted portion having a slanted surface extending from a front end, the slanted surface configured to engage the tire and elevate the tire to the elevated position. The ramp includes a wheel supporting portion having a substantially flat surface extending from the slanted surface and a first chock molded therein proximate a back end, wherein the slanted surface and the substantially flat surface comprise a plurality of spaced apart rows of spaced apart columns wherein the spaced apart columns extend from apertures in the slanted surface and the substantially flat surface and terminate at a distal end that is proximately even with the front end.

25 Claims, 14 Drawing Sheets

NESTABLE WHEEL RAMPS WITH REMOVABLE CHOCKS

BACKGROUND

The present disclosure relates to nestable ramps that are used to move a wheeled vehicles from ground level to an elevated position to provide clearance under a vehicle to perform maintenance and repairs. More particularly, the present disclosure relates to injection molded, polymeric nestable ramps that provide sufficient structural integrity to retain a vehicle in an elevated position while the vehicle is being maintained or repaired.

Many people who do not have access to a vehicle lift utilize ramps to lift wheeled vehicles to elevated positions above ground level to provide clearance and access under the vehicle to perform maintenance and repairs. Instead of a lift, ramps are typically used by do it yourself mechanics at the mechanic's home or shop.

Ramps are typically constructed of metal such as steel to provide structural integrity to retain the vehicle in the elevated position without buckling or collapsing under the weight of the elevated vehicle. However, metal ramps are heavy and difficult to maneuver into a desired position prior to driving the vehicle onto the ramp platforms. Further, many metal ramps are unable to be nested one on top of the other, and therefore require significant floorspace to store. Additionally, the weight of the metal ramps may preclude storage on some shelves or racks within a home garage or shop because the weight of the ramps could result in the shelves or racks bowing or breaking.

In order to overcome the weight, bulk and storage issues of metal ramps, polymeric ramps have been developed, which are light weight and, in some instances, nestable. However, polymeric materials lack the strength of metal materials, and ramps made of polymeric materials can bend and buckle under the weight of the elevated vehicle. As such, there is a need for a light weight, polymeric ramp that is nestable to conserve storage space while also being able to withstand the weight of larger vehicles.

SUMMARY

An aspect of the present disclosure relates to a monolithic, polymer ramp for elevating a tire of a vehicle from ground level to an elevated position. The ramp includes a slanted portion having a slanted surface extending from a front end, the slanted surface configured to engage the tire and elevate the tire to the elevated position. The ramp includes a wheel supporting portion having a substantially flat surface extending from the slanted surface and a first chock molded therein proximate a back end, wherein the slanted surface and the substantially flat surface comprise a plurality of spaced apart rows of spaced apart columns wherein the spaced apart columns extend from apertures in the slanted surface and the substantially flat surface and terminate at distal ends that are proximately even with the front end.

Another aspect of the present disclosure relates to a kit for elevating a tire of a vehicle from ground level to an elevated position and retaining the tire in the elevated position. The kit includes a ramp comprising a slanted portion having a slanted surface extending from a front end, the slanted surface configured to engage the tire and elevate the tire to the elevated position, and a wheel supporting portion having a substantially flat surface extending from the slanted surface and a first chock molded therein proximate a back end. The wheel supporting portion includes a plurality of receptacles proximate the back end. The kit includes a plurality of chocks, a portion of the plurality of chocks having a complementary configuration to that of the receptacles such that the plurality of chocks are configured to be retained to the receptacles and removed from the receptacles to secure a wheel in a selected position on the wheel supporting portion.

Another aspect of the present disclosure relates to a plurality of monolithic, polymer ramps for elevating a tire of a vehicle from ground level to an elevated position. Each ramp comprises a slanted portion having a slanted surface extending from a front end, the slanted surface configured to engage the tire and elevate the tire to the elevated position, and a wheel supporting portion having a substantially flat surface extending from the slanted surface and a first chock molded therein proximate a back end. The slanted surface and the substantially flat surface comprise a plurality of spaced apart rows of spaced apart columns wherein the spaced apart columns extend from apertures in the slanted surface and the substantially flat surface and terminate at a distal end that are proximately even with the front end wherein the plurality of ramps are configured to nest one on top of the other.

BRIEF DESCRIPTION OF THE DRAWINGS

FIG. 3 is a side view of the nested ramps.

DETAILED DESCRIPTION

Figure 1:
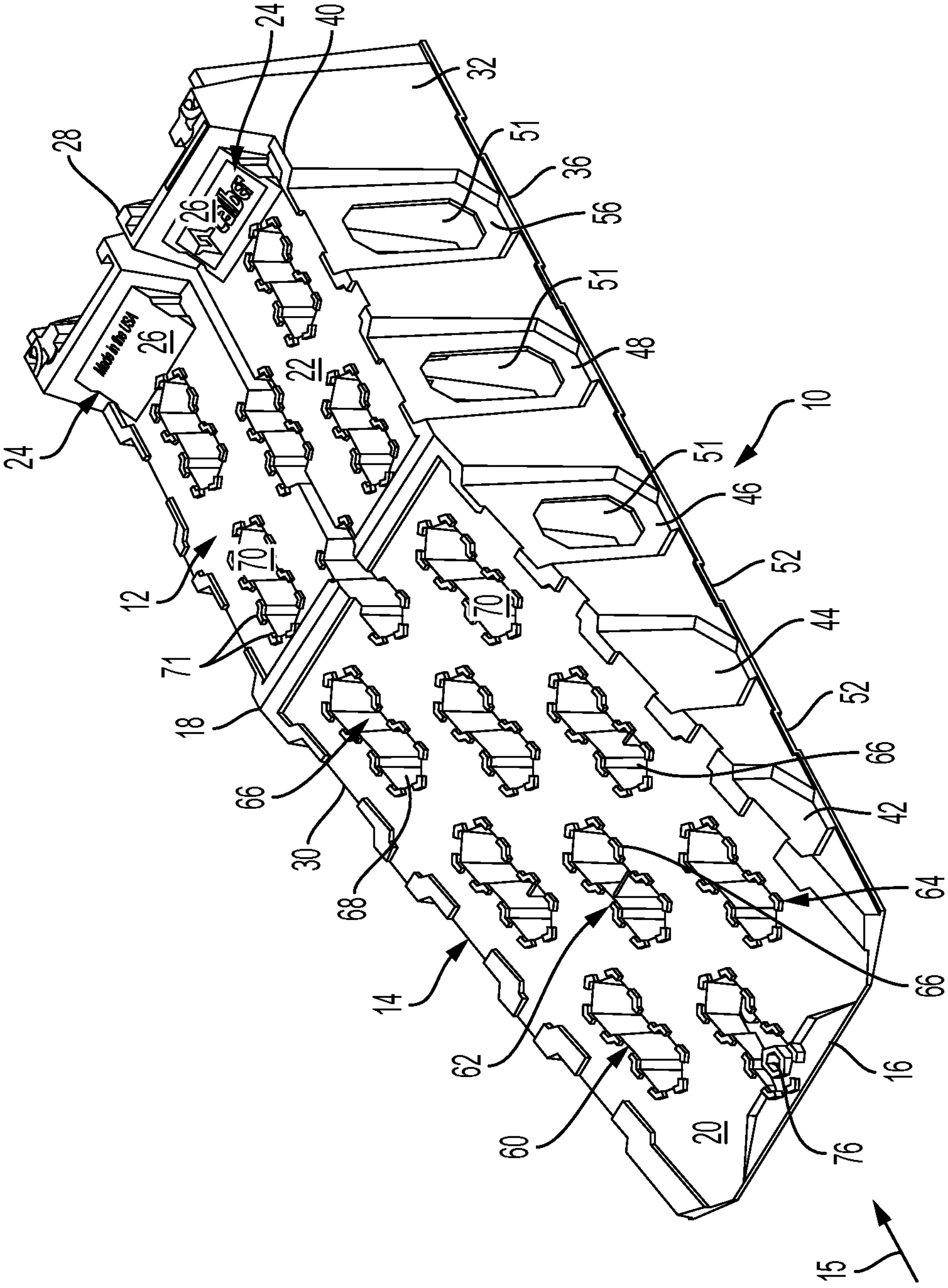
FIG. 1 is a perspective view of a ramp for a wheel of a vehicle.
Figure 2:
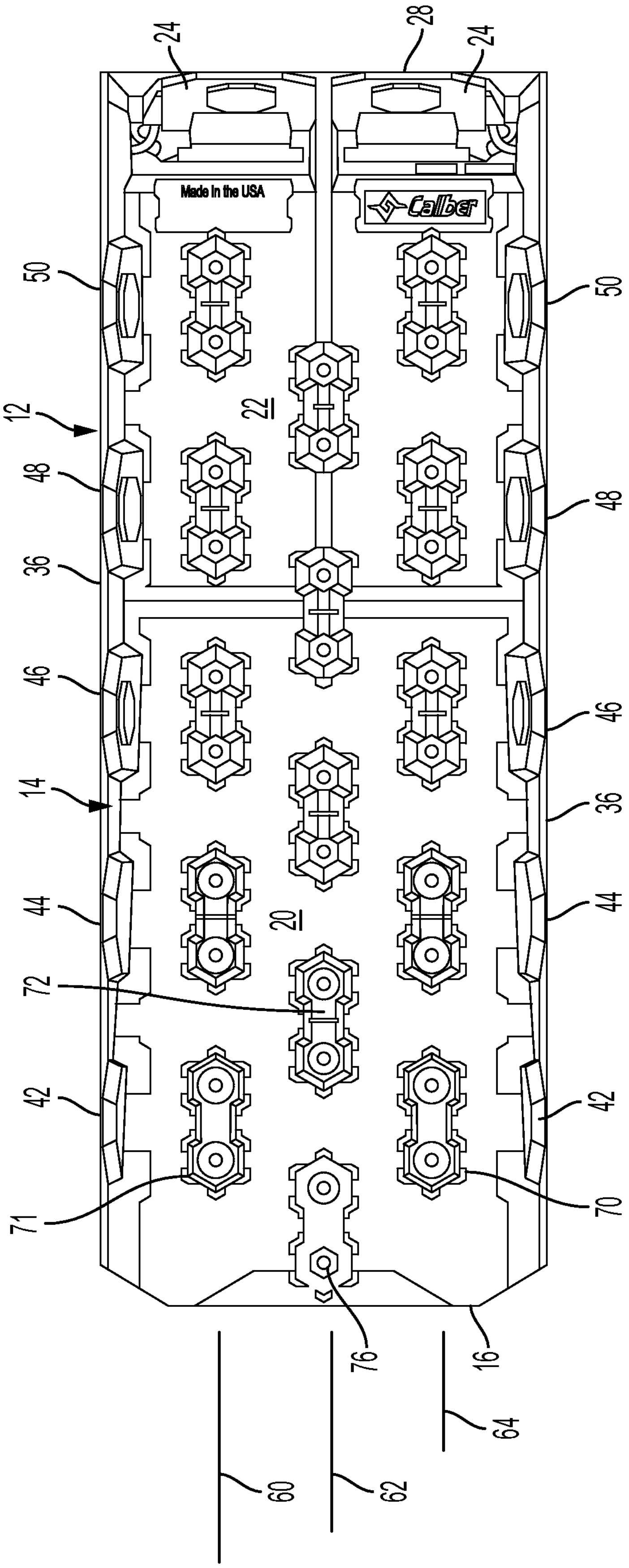
FIG. 2 is a top view of the ramp.
Figure 3:
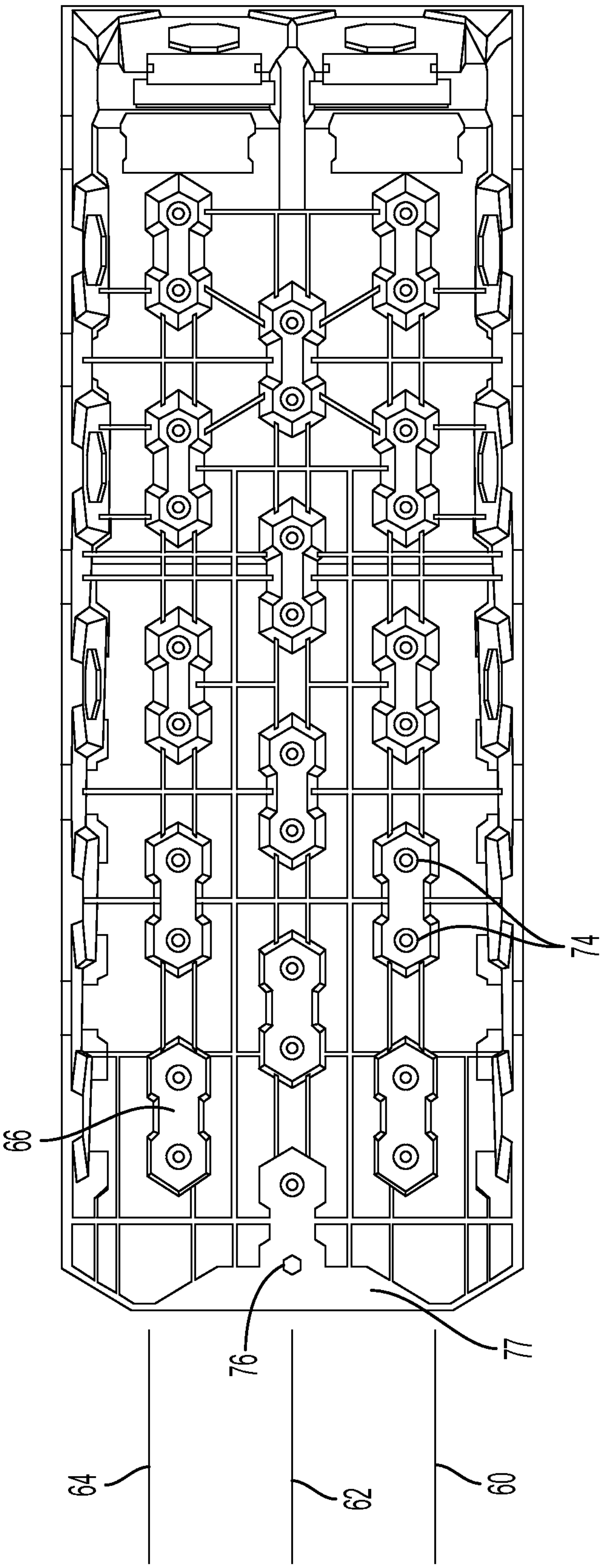
FIG. 3 is a bottom view of the ramp.
Figure 4:
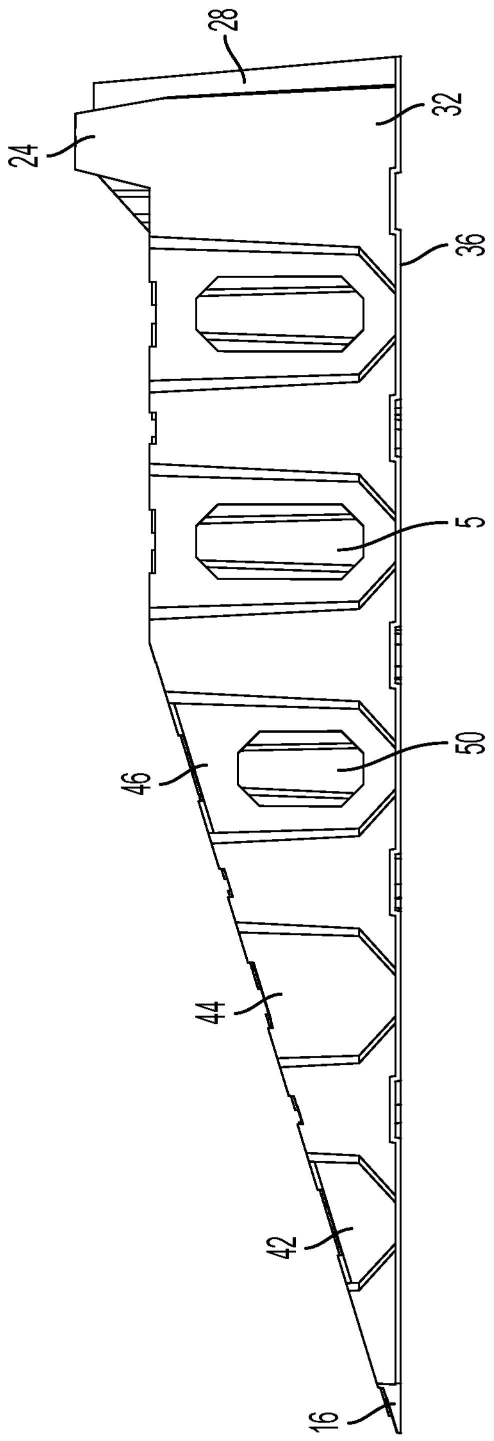
FIG. 4 is a right side view of the ramp.
Figure 5:
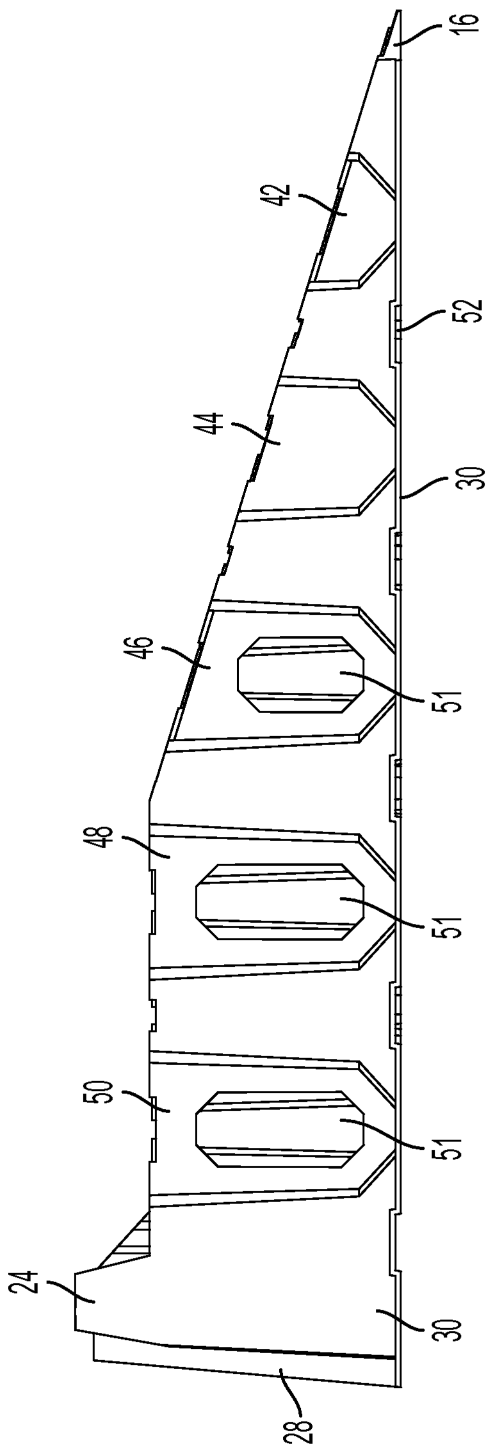
FIG. 5 is a left side view of the ramp.
Figure 6:
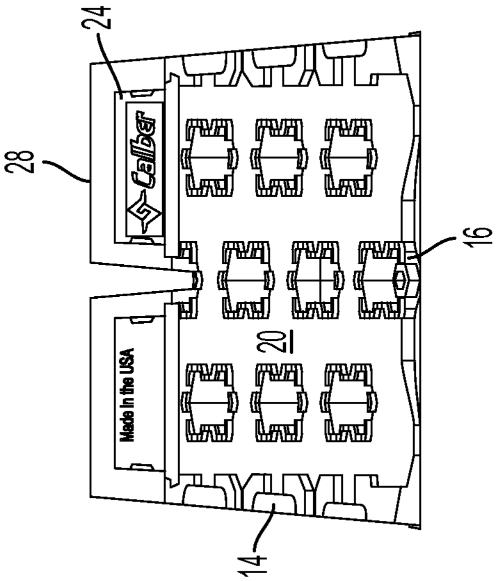
FIG. 6 is a front view of the ramp.
Figure 7:
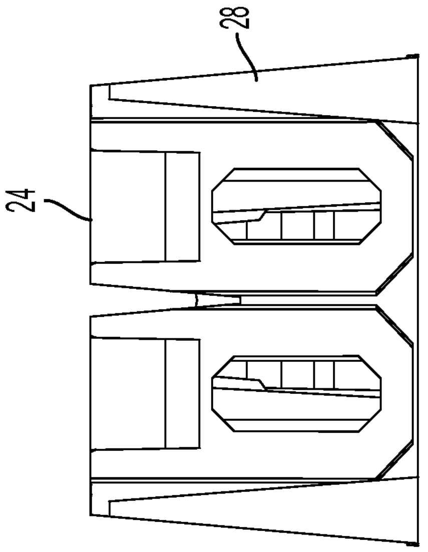
FIG. 7 is a back view of the ramp.
Figure 8:
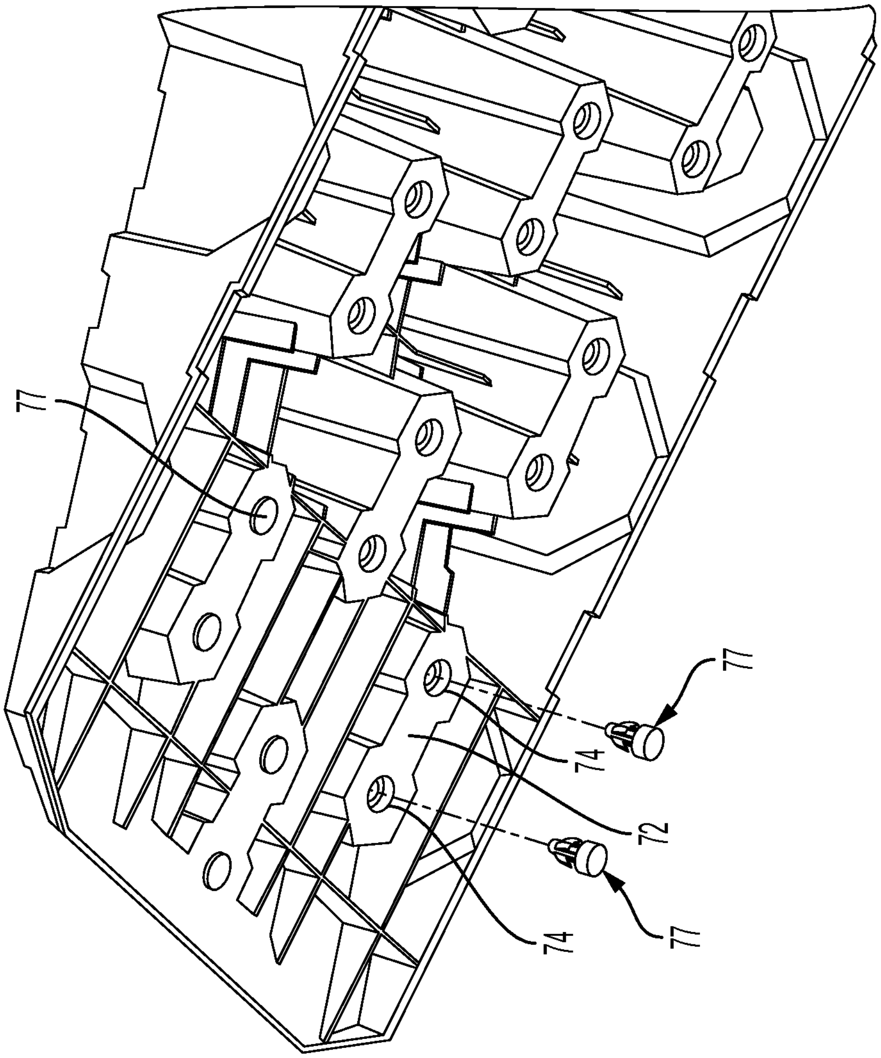
FIG. 8 is bottom view of the ramp with footpads.
Figure 9:
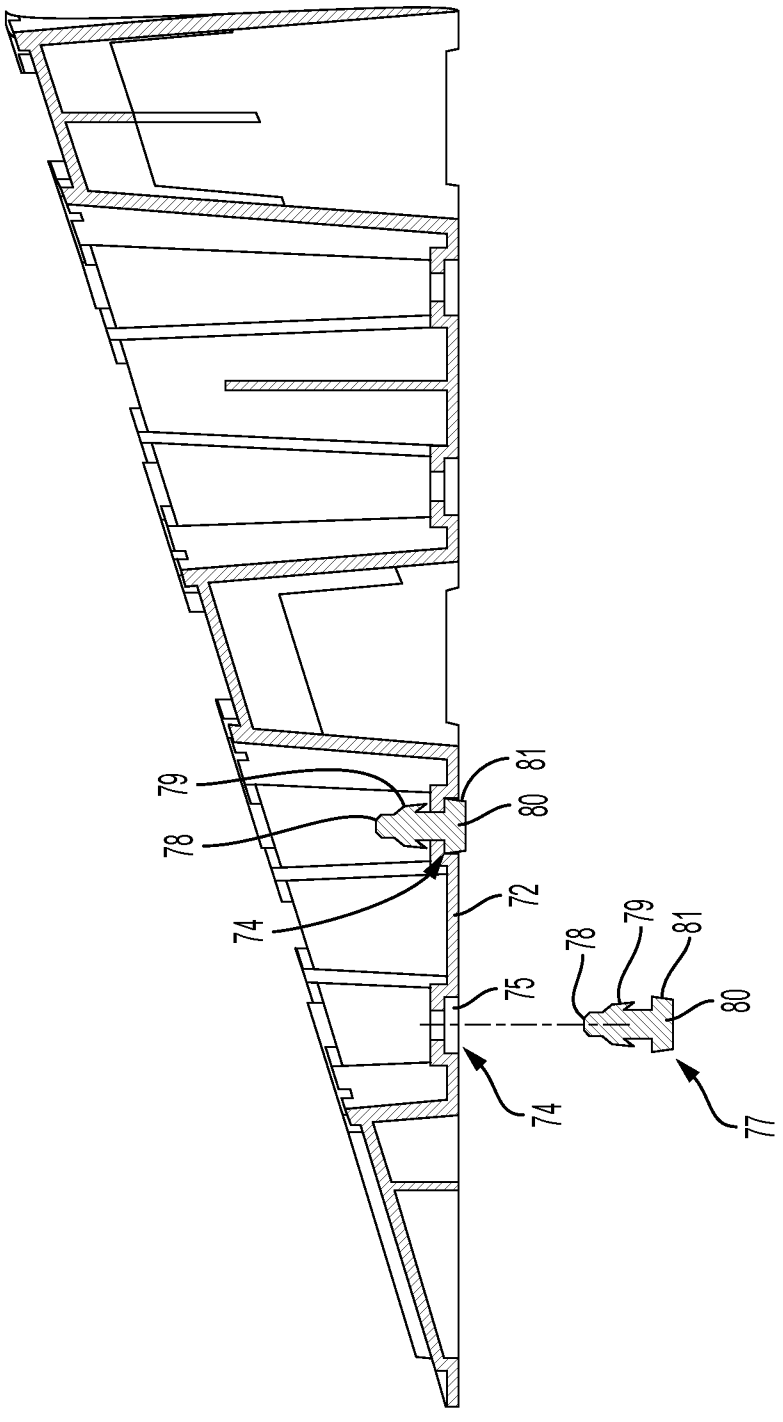
FIG. 9 is a section view of the ramp with footpads.

A monolithic nestable ramp for engaging a tire of a vehicle and elevate a vehicle is illustrated at 10. The ramp 10 is typically constructed of a polymeric material and is formed through a molding process. The ramp 10 is lightweight while having the structural integrity to withstand the weight of an elevated vehicle. Further, the ramp 10 is nestable with one or more ramps to reduce the space required to store the plurality of ramps 10.

Referring to FIGS. 1-7, the ramp 10 includes a wheel supporting portion 12 and a slanted portion 14, where the slanted portion 14 includes a front end 16 at ground level and a transition 18 that leads to the wheel engaging portion 12. As a tire of a vehicle moves in a direction of travel as indicated by arrow 15, the tire engages the front end 16, travels up an upper surface 20 of the slanted portion 14 and over the transition 18 of the slanted portion 14 and onto an upper surface 22 of the wheel supporting portion 12.

The upper surface 22 of the wheel supporting portion 12 has a width and length that accommodates most wheels that are used on typical vehicles used for personal use. The upper surface 22 leads to spaced apart, front chocks 24 that have slanted surfaces 26 that are configured to engage the tire and prevent the tire from rolling off a back end 28 of the ramp 10. As discussed later, the ramp 10 includes removable chocks that are configured to engage the back side of the tire from the transition 18 where the chocks are configured to prevent the tire from rolling backward on the upper surface 22 of the wheel supporting portion 12.

The ramp includes a left side wall 30 and a right side wall 32. The left and right side walls 30 and 32 have ground engaging bottom lips 34 and 36 and upper edges 38 and 40, respectfully that transition to the upper surfaces 20 and 22 of the slanted portion 14 and the wheel supporting portion 12, all respectively. Each of the sidewalls 30 and 32 include indents 42, 44, 46, 48 and 50 that are spaced apart from the front end 16 to the back end 28 of the ramp 10. The indents 42, 44, 46, 48 and 50 provide an irregular surface that aids in providing rigidity along with the lips 34 and 36 to the side walls 30 and 32. The indents 44, 46 and 48 include apertures 51 that aid in preventing a vacuum from forming between adjacent sidewalls 30 and 32 when two or more ramps 10 are nested together, while also reducing material costs for the ramp 10. The ground engaging bottom lips 34 and 36 include spaced apart channels 52 along a length of the sidewalls 30 and 32.

The ramp 10 includes a plurality of rows 60, 62 and 64 of spaced apart columns 66. The columns 66 include continuous walls 68 that begin at openings 70 in the upper surfaces 22 and 26 of the wheel supporting portion 12 and the ramped portion 14 that terminate proximate even with the bottom lips 34 and 36 of the side walls 30 and 32, such that the columns 66 provide support, rigidity and structural integrity to the ramp 10 by distributing forces across the ramp 10 as the wheel of the vehicle travels up the ramp portion 14 and rests on the wheel supporting portion 12. The continuous walls 68 are tapered having a larger cross section proximate the opening 70 that reduces as the column extends toward the ground level such that the columns 66 of adjacent ramps 10 nest within each other.

The columns 66 include floor portions 72 that span the lower portion of the continuous wall 68 to aid in providing rigidity and structural integrity. The floor portions 72 include spaced apart apertures 74 that have countersunk portions 75. Each aperture 74 is configured to accept a floor pad 77 that are constructed of a material that aids in gripping the ground surface. The floor pad 77 includes a top end 78 having barbs 79 and a back end 80 with a head 81. To install the floor pad 77 into the apertures 74, manual force is place on the head 81 such that the barbs compress when force through the aperture 74. The floor pad 77 is of a length such that when the head 81 is within the countersunk portion 75 of the aperture 74, the barbs 79 extend above the aperture 74 and expand which retains the floor pad 77 within the aperture 74. A thickness of the head 81 is slightly larger than the height of the countersunk portion 75 such that the back end 80 extends beyond the bottom edge to retain the ramp 10 in the selected position as a wheel engages the ramp 10.

The upper surfaces 22 and 26 of the of the wheel supporting portion 12 and the ramped portion 14 include spaced apart raised projections 71 about the openings 70. The raised projections 71 interrupt the substantially flat surfaces and provide traction to the wheel as the wheel moves over the upper surfaces 22 and 26.

The ramp 10 also includes an aperture 76 substantially centrally located along the width of the front end 16 of the ramp 10. The aperture 76 is configured to attach the ramp 10 to a wall hook to store the ramp 10 above ground level. Also, the aperture 76 is configured to accept a stake or to be positioned about a raised shaft at ground level to retain the ramp 10 in a selected position as the wheel of the vehicle engages the ramp 10.

Figure 10:
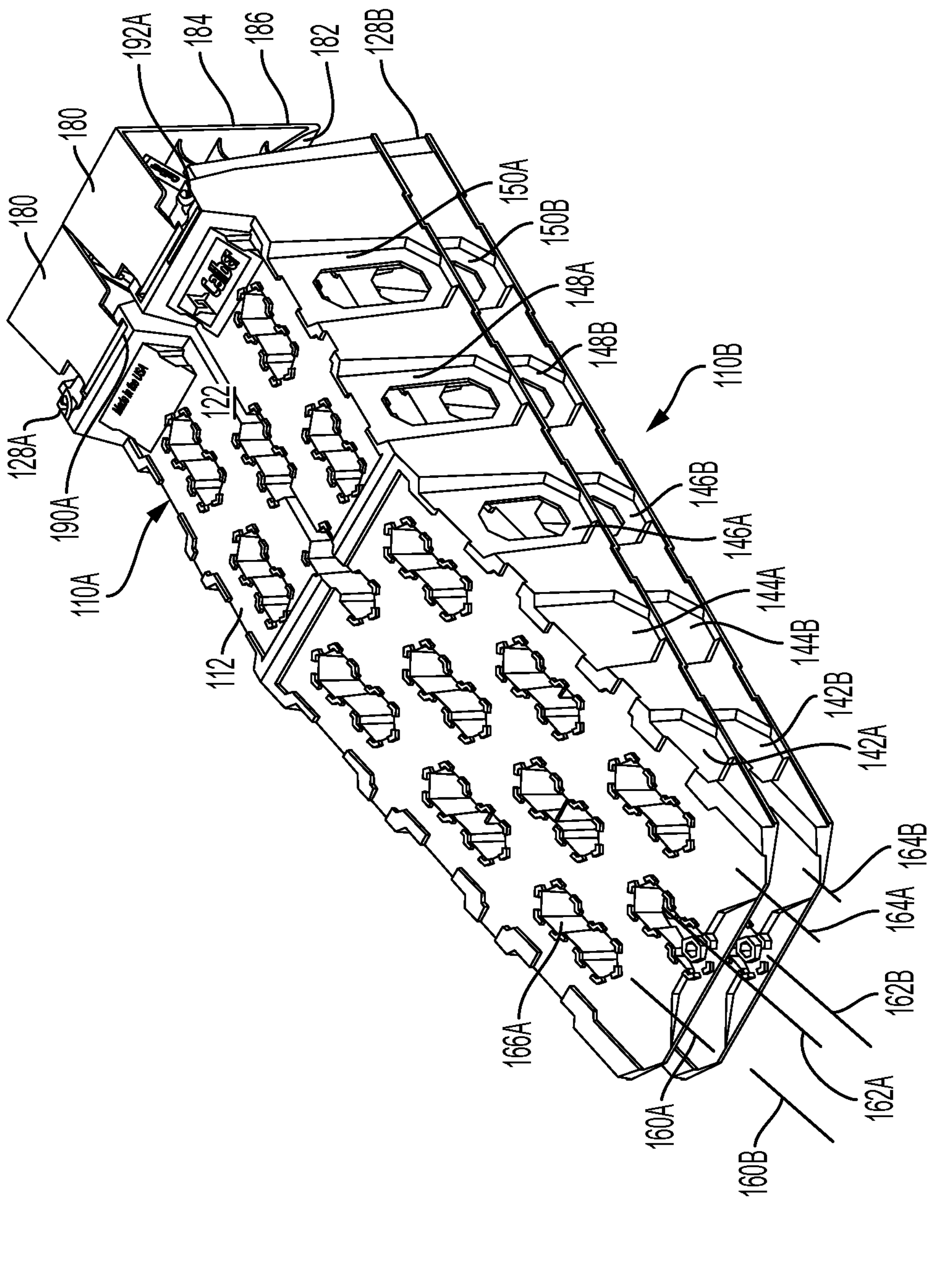
FIG. 10 is a perspective view of nested ramps with removable chocks.
Figure 11:
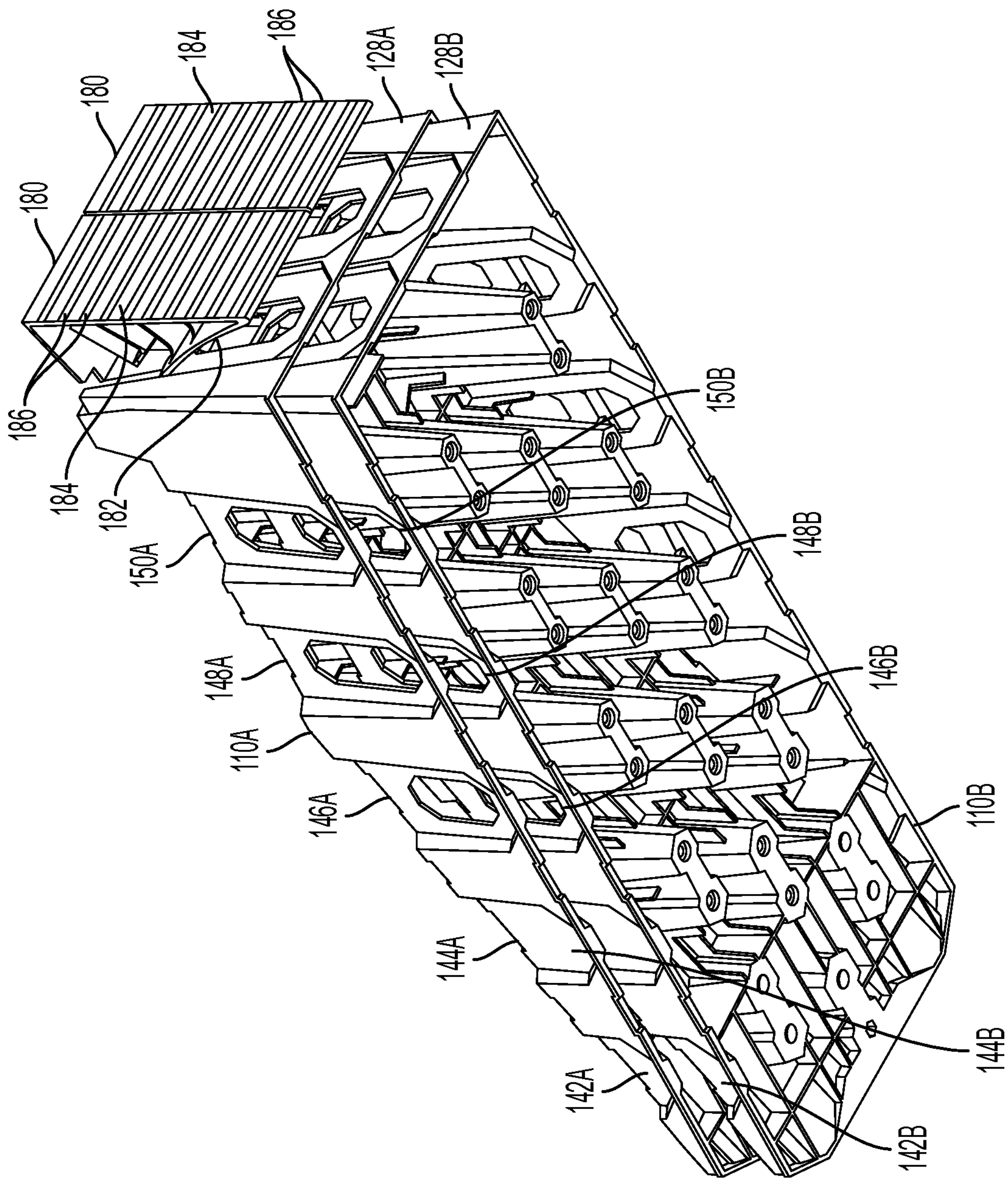
FIG. 11 is another perspective view of the nested ramps with removable chocks
Figure 12:
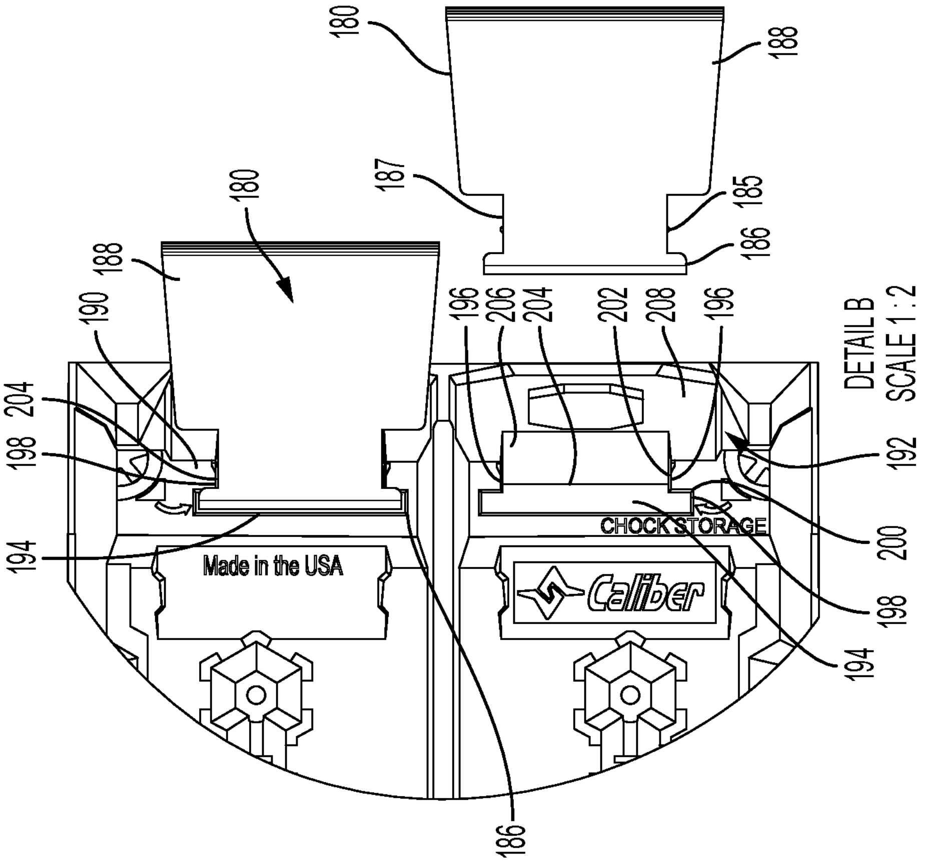
FIG. 12 is a close up view of the ramp with one chock removed therefrom.
Figure 14:
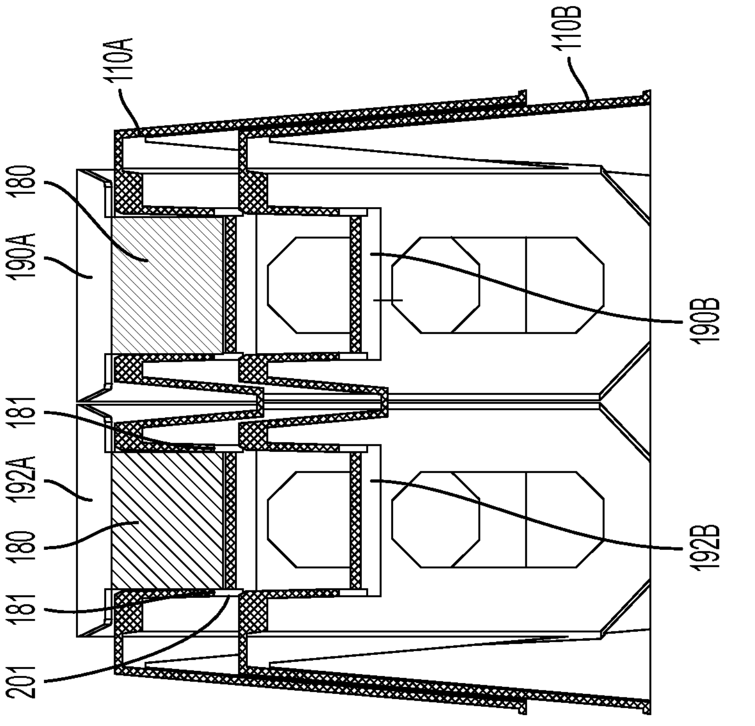
FIG. 14 is sectional view of the chocks secured within the ramp.
Figure 13:
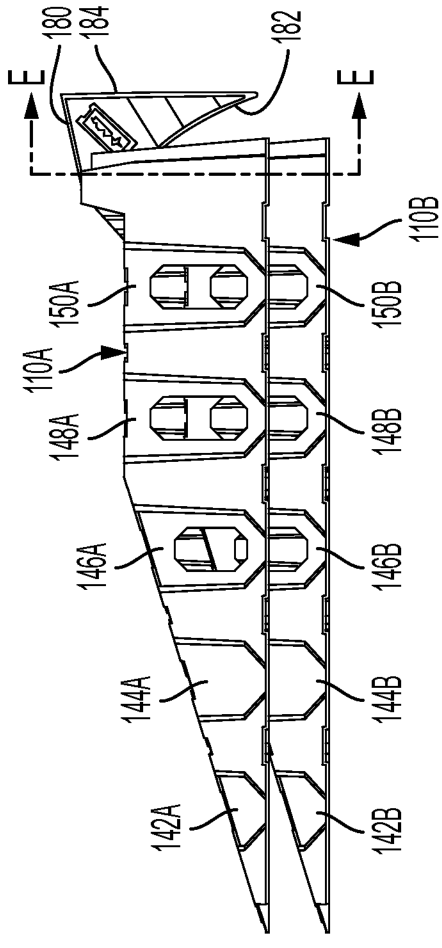

Referring to FIGS. 10 and 11, nested ramps 110A and 110B are illustrated with a pair of chocks 180. The nested ramps 110A and 110B have the same configuration as the ramp 10 described in FIGS. 1-7 where reference characters will be raised by 100 and A and B designate the different ramps 110. FIGS. 10 and 11 illustrate different views of the nested ramps 110A and 110B, the pair of chocks 180 are illustrated as being retained in the upper ramp 110A. The pair of chocks 180 are retained in the ramp 110A so that the ramps 110A and 110B can be stored in a nested configuration. However, in use one chock 180 would be used with the ramp 110A and the other chock 180 would be used with the other ramp 110B, as the ramps are typically used in pairs.

Referring to FIGS. 10-14, each chock 180 includes an arcuate surface 182, configured to engage a round treaded surface of a tire and a substantially flat surface 184 configured to engage the upper surface 122 of the wheel supporting portion 112. The substantially flat surface 184 includes ridges 186 that are configured to grip the upper surface 122 of the wheel supporting portion 112.

The back end 128A and 128B of the ramps 110A and 110B include receptacles 190 and 192, where only the receptacles 190A and 192A are illustrated. The receptacles 190A and 192A have substantially the same configurations such that either chock 180 can be placed in either receptacle 190A and 190A.

The receptacles 190 and 192 each include a back wall 194 and a shoulder 196 having surfaces 198, 200 and 202 that define a channel 204 between the back wall 194 and the surface 198 that leads to a constricted opening 206 that is in communication with a cavity 208. The surface 200 includes an opening 201 that is configured to engage a retaining member 185 on opposing sides of the chock 180 to retain the chock 180 within the receptacles 190A and 190B.

Each chock 180 includes a dovetail configuration with a flat portion 186 configured to be positioned within a channel 204, a constricted portion 187 with the retaining members 185 extending therefrom, where the constricted portion 187 is configured to be positioned within the constricted opening 206 and the retaining members 185 are configured to be positioned with the openings 201. The chock 180 includes a front portion 188 having a complementary configuration to that of the cavity 208. When the chock 180 is positioned within the receptacles 190 or 192, the dovetail configuration of the chock 180 and the receptacles 190 and 192, the complementary configurations of the portions of the chocks 180 and the receptacles 190 and 192 and the retaining members 185 positioned within the openings 201 retain the chocks 180 to the ramp 110A. The chocks 180 are removed from the receptacles 190 and 192 by applying an upward force, typically manual force, to remove the retaining members 185 from the openings 201 and thereafter remove the chock 180 from the receptacle 190 and/or 192.

Figure 15:
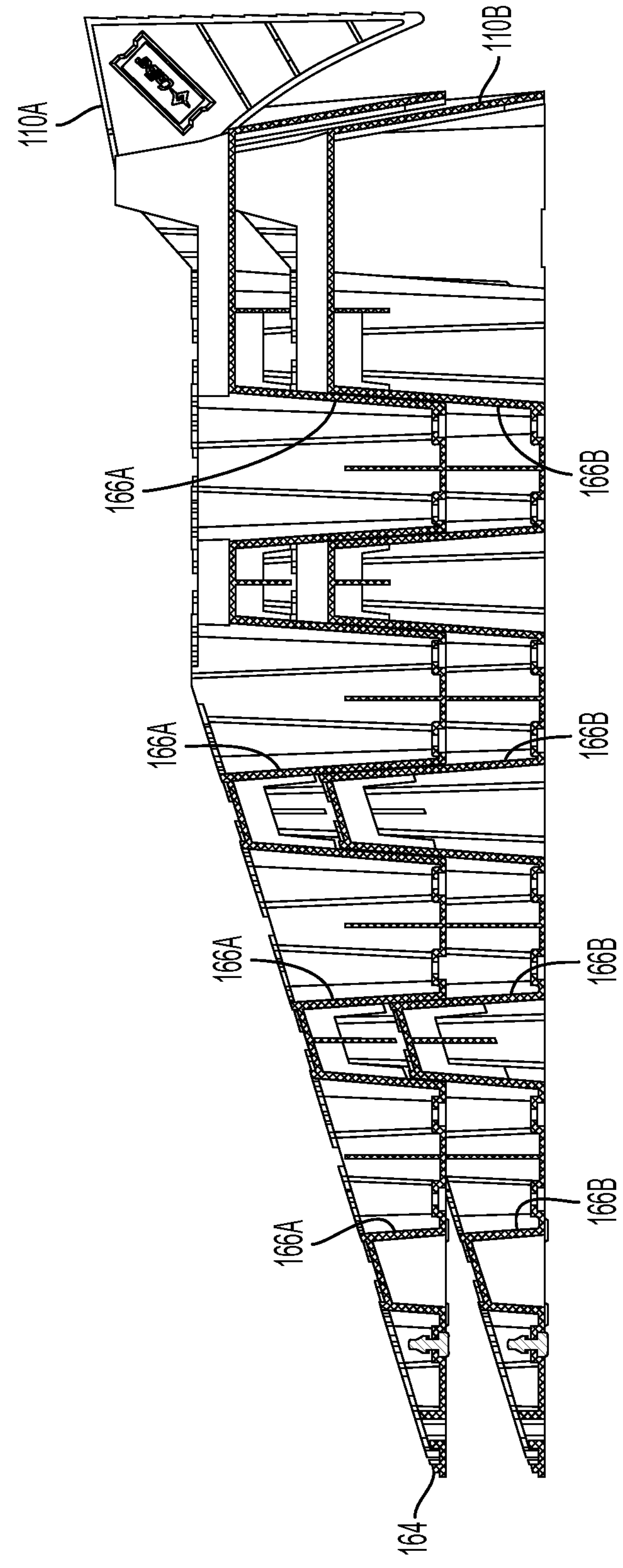
FIG. 15 is a sectional view taken along a centerline of the nested ramps.

Referring to FIGS. 10, 11 and 15, the ramp 110A nests within ramp 110B, where exterior indents 142A, 144A, 146A, 148A and 150A nest within exterior indents 142B, 144B, 146B, 148B and 150B along the side walls 130A and B and 132A and B. Additionally, the receptacle 190A and 192A nest within the receptacles 190B and 192B. Also, the plurality of rows 160A, 162A and 164A of spaced apart columns 166A nest within the plurality of rows 160B, 162B and 164B of spaced apart columns 166B. The ability to nest a plurality of ramps allows for compact storage and transportation within a vehicle.

Although the present invention has been described with reference to preferred embodiments, workers skilled in the art will recognize that changes may be made in form and detail without departing from the spirit and scope of the invention.

The invention claimed is:

1. A monolithic, polymer ramp for elevating a tire of a vehicle from ground level to an elevated position, the ramp comprising:

a slanted portion having a slanted surface extending from a front end, the slanted surface configured to engage the tire and elevate the tire to the elevated position; and a wheel supporting portion having a substantially flat surface extending from the slanted surface and a first chock molded therein proximate a back end, wherein the slanted surface and the substantially flat surface comprise a plurality of spaced apart rows of spaced apart columns wherein the spaced apart columns extend from apertures in the slanted surface and the substantially flat surface and terminate at a distal end that is proximately even with the front end;

a plurality of receptacles proximate the back end, each receptacle including a back wall and a shoulder defining a channel that leads to a constricted opening in communication with a cavity, the shoulder including an opening configured to engage a retaining member of a removable chock; and a removable chock having a dovetail configuration with a flat portion configured to be positioned within the channel, a constricted portion with retaining members extending therefrom configured to be positioned within the constricted opening and the opening in the shoulder, and a front portion having a complementary configuration to that of the cavity.

2. The ramp of claim 1, wherein each of the columns of the plurality of rows decreases in cross section from the opening to the distal end.

3. The ramp of claim 1, wherein the plurality of rows comprises three rows of columns that are substantially uniformly spaced apart across a width of both the slanted surface and the substantially flat surface.

4. The ramp of claim 1, wherein the distal ends of the columns are configured to engage a foot pad.

5. The ramp of claim 1 and further comprising left and right side walls engaging side edges of the slanted surface and the substantially flat surface and extending to be substantially even with the front end.

6. The ramp of claim 5 wherein each of the left and right side walls comprise exterior indents that are uniformly spaced along a length of each side wall.

7. The ramp of claim 1 and further comprising raised projections located about the apertures in the slanted surface and the substantially flat surface.

8. The ramp of claim 1 and further comprising a through bore proximate the front end, the through bore configured to engage an anchor and retain the ramp in a selected location.

9. A kit for elevating a tire of a vehicle from ground level to an elevated position and retaining the tire in the elevated position, the kit comprising:

a ramp comprising:

a slanted portion having a slanted surface extending from a front end, the slanted surface configured to engage the tire and elevate the tire to the elevated position; and a wheel supporting portion having a substantially flat surface extending from the slanted surface and a first chock molded therein proximate a back end, the wheel supporting portion having a plurality of receptacles proximate the back end, each receptacle including a back wall and a shoulder defining a channel that leads to a constricted opening in communication with a cavity the shoulder including an opening configured to engage a staining member of a chock; and a plurality of chocks, each chock having a dovetail configuration with a flat portion configured to be positioned within the channel, a constricted portion with retaining members extending therefrom configured to be positioned within the constricted opening and the opening in the shoulder and a front portion having a complementary configuration to that of the cavity, such that the plurality of chocks are configured to be retained to the receptacles and removed from the receptacles to secure a wheel in a selected position on the wheel supporting portion.

10. The kit of claim 9, wherein the slanted surface and the substantially flat surface of the ramp comprise a plurality of spaced apart rows of spaced apart columns wherein the spaced apart columns extend from apertures in the slanted surface and the substantially flat surface and terminate at a distal end that is proximately even with the front end.

11. The kit of claim 10, wherein each of the columns of the plurality of rows decreases in cross section from the opening to the distal end.

12. The kit of claim 10, wherein the plurality of rows comprises three rows of columns that are substantially uniformly spaced apart across a width of both the slanted surface and the substantially flat surface.

13. The kit of claim 10, wherein the distal ends of the columns are configured to engage one or more foot pads.

14. The kit of claim 10, wherein the ramp further comprises left and right side walls engaging side edges of the slanted surface and the substantially flat surface and extending to be substantially even with the front end.

15. The kit of claim 14 wherein each of the left and right side walls comprise exterior indents that are uniformly spaced along a length of each side wall.

16. The kit of claim 10 and wherein the ramp further comprises raised projections located about the apertures in the slanted surface and the substantially flat surface.

17. The kit of claim 9 wherein the ramp further comprising a through bore proximate the front end, the through bore configured to engage a projection on a wall to store the ramps above ground level.

18. A plurality of monolithic, polymer ramps for elevating a tire of a vehicle from ground level to an elevated position, each ramp comprising:

a slanted portion having a slanted surface extending from a front end, the slanted surface configured to engage the tire and elevate the tire to the elevated position; and a wheel supporting portion having a substantially flat surface extending from the slanted surface and a first chock molded therein proximate a back end, wherein the slanted surface and the substantially flat surface comprise a plurality of spaced apart rows of spaced apart columns wherein the spaced apart columns extend from apertures in the slanted surface and the substantially flat surface and terminate at a distal end that is proximately even with the front end wherein the plurality of ramps are configured to nest one on top of the other a plurality of receptacles proximate the back end, each receptacle including a back wall and a shoulder defining a channel that leads to a constricted opening in communication with a cavity, the shoulder including an opening configured to engage a retaining member of a removable chock; and a removable chock having a dovetail configuration with a flat portion configured to be positioned within the channel, a constricted portion with retaining members extending therefrom configured to be positioned within the constricted opening and the opening in the shoulder, and a front portion having a complementary configuration to that of the cavity.

19. The plurality of ramps of claim 18, wherein each of the columns of the plurality of rows of each ramp decreases in cross section from the opening to the distal end.

20. The plurality of ramps of claim 18, wherein the plurality of rows of each ramp comprises three rows of columns that are substantially uniformly spaced apart across a width of both the slanted surface and the substantially flat surface.

21. The plurality of ramps of claim 18, wherein the distal ends of the columns of each ramp are configured to engage one or more foot pads.

22. The plurality of ramps of claim 18 and where each ramp further comprising left and right side walls engaging side edges of the slanted surface and the substantially flat surface and extending to be substantially even with the front end.

23. The plurality of ramps of claim 22, wherein each of the left and right side walls of each ramp comprises exterior indents that are uniformly spaced along a length of each side wall.

24. The plurality of ramps of claim 18, and wherein each ramp further comprises raised projections located about the apertures in the slanted surface and the substantially flat surface.

25. The plurality of ramps of claim 18, and wherein each ramp further comprises a through bore proximate the front end, the through bore configured to engage a projection on a wall to store the ramps above ground level.

* * * * *